United States Patent [19]
Horwill

[11] Patent Number: 5,630,639
[45] Date of Patent: May 20, 1997

[54] FIXING ASSEMBLY FOR VEHICLE HOOD PROTECTORS

[76] Inventor: Rodney E. Horwill, PO Box 171, Salisbury Queensland 4107, Australia

[21] Appl. No.: 584,066

[22] Filed: Jan. 11, 1996

[30] Foreign Application Priority Data

Apr. 13, 1995 [AU] Australia ................... PN2407

[51] Int. Cl.⁶ ........................................ B60J 1/00
[52] U.S. Cl. ........................................ 296/91
[58] Field of Search ........................ 296/91, 180.1

[56] References Cited

U.S. PATENT DOCUMENTS

| | | | |
|---|---|---|---|
| 4,471,991 | 9/1984 | Matthias | 296/91 |
| 4,952,006 | 8/1990 | Willey | 296/91 |
| 5,067,206 | 11/1991 | Metcalfe | 296/91 X |
| 5,234,247 | 8/1993 | Pacer | 296/91 |

FOREIGN PATENT DOCUMENTS 818267  7/1969  Canada ................... 296/91

*Primary Examiner*—Joseph D. Pape
*Attorney, Agent, or Firm*—Shoemaker and Mattare, Ltd.

[57] ABSTRACT

A fixing assembly for vehicle hood protectors, including a bracket of strip-like form having a flange which is secured to the underside of a vehicle hood, a locating groove which receives the lower edge of the hood lip and a mounting flange which extends outwardly of the hood and to which the hood protector is mounted. The flange which is secured to the underside of the hood has a slot provided with saw-tooth configurations on opposite sides, the slot being arranged to receive an expandable plug which is provided with complementary saw-tooth configurations, such that it may be located at one of a series of positions along the slot. The plug is receivable in an aperture in the underside of the hood to secure the flange and thus the bracket to the hood.

20 Claims, 4 Drawing Sheets

FIXING ASSEMBLY FOR VEHICLE HOOD PROTECTORS

FIELD OF THE INVENTION

This invention relates to an improved fixing assembly which is particularly but not exclusively applicable to the fixing of motor vehicle hood protectors or air deflectors to a motor vehicle hood.

BACKGROUND OF THE INVENTION

Vehicle hood protectors of many different designs are currently known and used in situations where the leading edge of a vehicle hood is required to be protected from damage caused by stones or other debris. Some protectors are also designed to deflect air over the roof of the vehicle to reduce debris build-up upon the vehicle front windscreen. Generally, hood protectors are formed of plastics material, such as acrylic and many different arrangements have been proposed or used for fixing the protectors to the vehicle hood. The known fixing systems, however, suffer disadvantages in so far that they may themselves cause damage to the vehicle hood and the paintwork thereof as the vehicle hood may be required to be drilled to accept a fixing system. In addition, a different fixing system is usually required to be specifically designed to suit the type and style of hood protector and the vehicle to which the protector is to be fitted.

SUMMARY OF THE INVENTION

The present invention aims to overcome or alleviate one or more of the above disadvantage or at least provide an alternative to the known fixing assemblies. In a particularly preferred aspect, the present invention aims to provide a fixing assembly which will securely hold a vehicle hood protector or air deflector in position and which is applicable to many different types and styles of vehicle hood. The present invention further aims in a preferred aspect to provide an assembly which permits easy detachment or attachment of the hood protector or deflector and which further may be easily mounted to a vehicle hood. Other objects and advantages of the invention will become apparent from the following description.

The present invention thus provides in a preferred form a fixing assembly for mounting a vehicle hood protector to the hood of a vehicle, said hood being of the type having a downwardly extending leading lip, said fixing assembly including a bracket having a hood protector mounting portion adapted to be located externally of said vehicle hood, a locating portion adapted to locate over the lip of said hood and a securing portion adapted to be secured to the underside of said or hood.

The mounting portion preferably is in the form of a flange which is provided with a threaded aperture for receipt of an attachment screw or similar fastener for attachment of the hood protector to the mounting portion through an aperture or slot on the hood protector.

The locating portion is preferably in the form of an elongated groove or recess which may locate over to receive the lower or free edge of the hood lip.

The securing portion is adapted to receive a fastener assembly for fastening the securing portion to the hood. The fastener assembly is preferably adjustable along the securing portion and for this purpose may include locating means adapted for alignment with complementary locating means on the bracket securing portion. Such locating means may be defined by complementary saw-tooth configurations on the fastener assembly and securing portion of the bracket.

The fastener assembly may comprise an expandable plug and the securing portion preferably may include a slot for receipt of the expandable plug. The slot may have on opposite sides, saw tooth configurations and the plug may be provided with similar saw tooth configurations for complementary co-operation therewith. The plug, therefore, may be adjusted and positively positioned longitudinally of the slot. When the fastener assembly secures the bracket securing portion to the hood, the locating portion is urged firmly into engagement with the hood lip which will resist vibrational and downward loads applied by the hood protector in use.

The hood has an opening adapted to receive the plug which may be expanded by means of a screw. The plug may thus be positioned along the securing portion until aligned with the opening in the hood for location in same. When located, the securing portion and plug are positively locked together by the aforesaid toothed configuration.

The bracket may be in the form of a sheet metal bracket which may be treated to avoid corrosion and damage to the hood such as by being plastic coated. The bracket suitably is formed of a resilient metal strip. Alternatively, the bracket may be formed of plastics.

Whilst the fixing assembly of the invention is particularly suitable for securing hood protectors to vehicles, it may also be used for securing other similar products such as air deflectors or other vehicle accessories to a hood and accordingly the term "hood protector" as used herein includes all such products.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE EMBODIMENT

Figure 1:
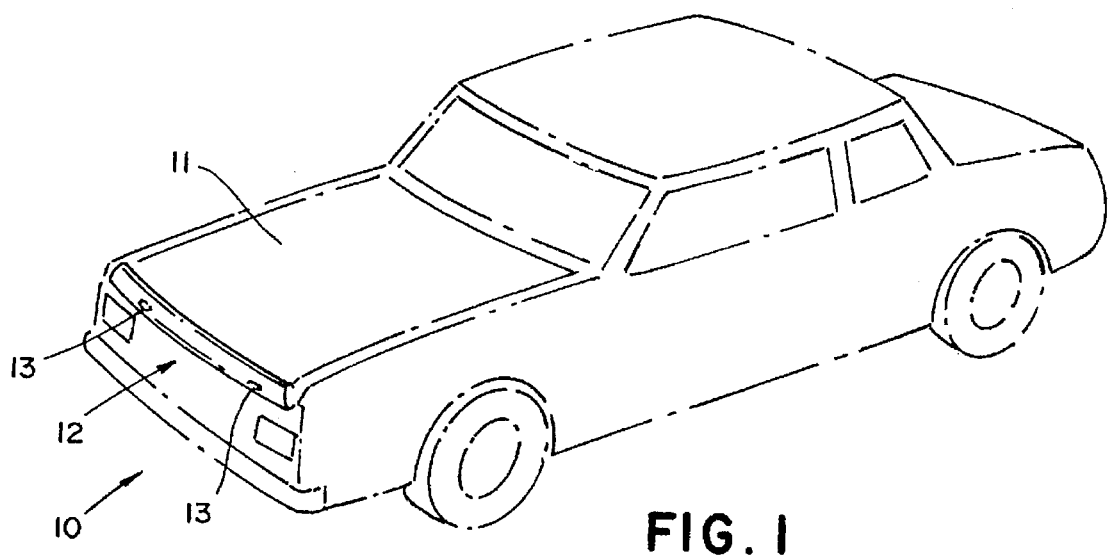
FIG. 1 illustrates a vehicle provided with a hood protector secured to the hood of the vehicle using the fixing assembly of the present invention.

Referring to the drawings and firstly to FIG. 1 there is illustrated a vehicle 10 having a hood 11 to which is mounted a hood protector or air deflector 12 which may be of any design which is known in the art. Such hood protectors or air deflectors 12 are normally formed of a plastics material such as an acrylic or polycarbonate and include an upward directed hood protecting or air deflecting portion and a lower usually integrally formed mounting flange for securing the protector or deflector to the hood. The hood protector 12, in this instance is secured to the vehicle hood 11 by using in this embodiment a pair of fixing assemblies 13 according to the present invention which as shown in FIG. 1 are spaced apart to secure the hood protector 12 at spaced apart positions to the hood 11.

Figure 2:
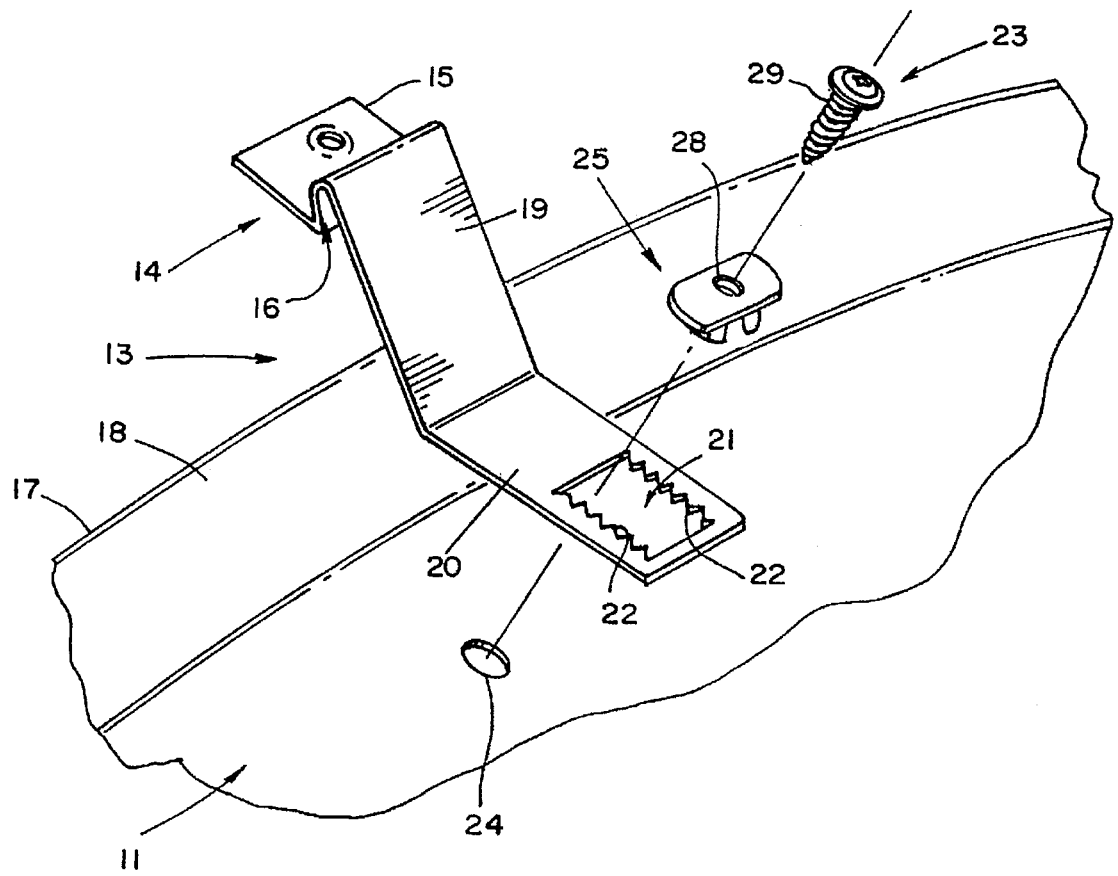
FIG. 2 is an exploded view of the fixing assembly according to the invention associated with a vehicle hood.
Figure 3:
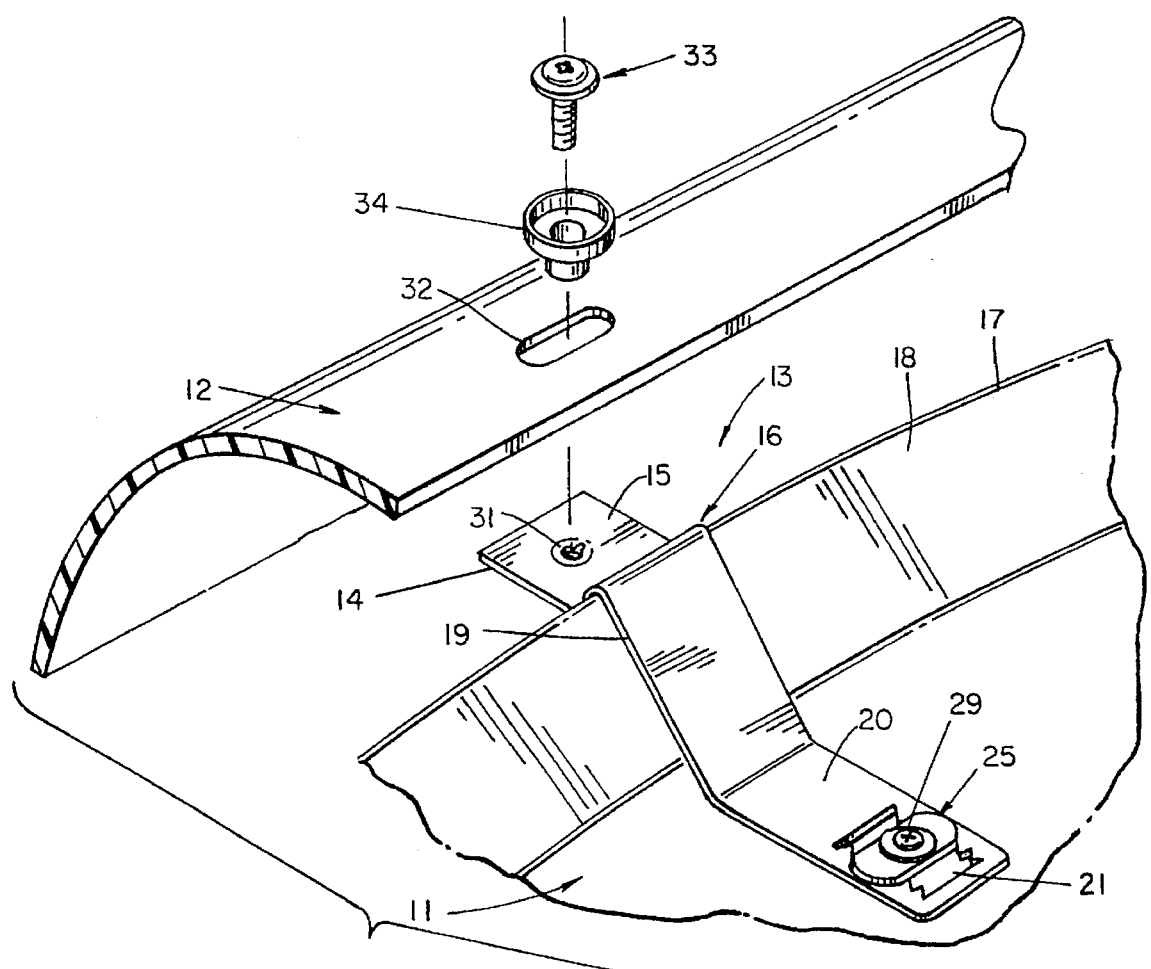
FIG. 3 illustrates in exploded view a hood protector associated with the fixing assembly of FIG. 1.
Figure 4A:
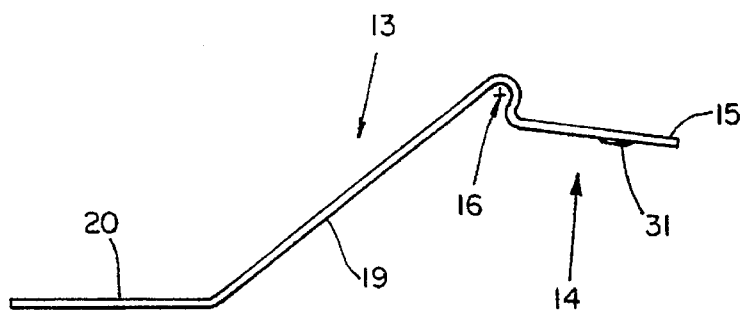
FIGS. 4a and b illustrate in plan and side elevation a mounting bracket for the fixing assembly.
Figure 4B:
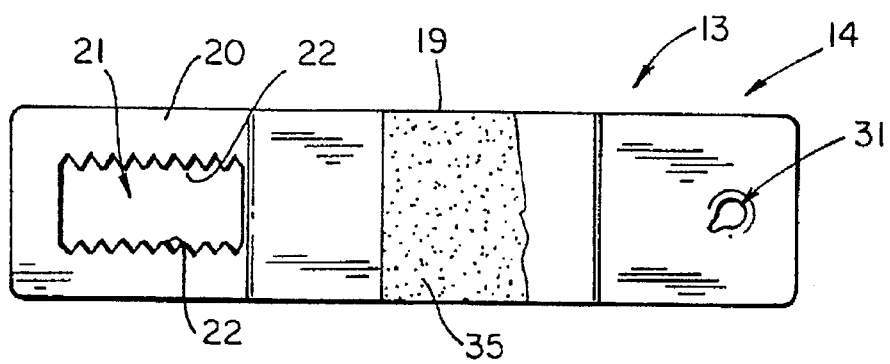

Each fixing assembly 13, as more clearly shown in FIG. 2 and 3 includes a bracket 14 formed in this embodiment from a metal strip and preferably stainless steel strip and having at one end, and as shown also in FIGS. 4a and 4b, a substantially planar hood protector mounting flange 15 and a transversely extending locating recess 16 rearwardly of the mounting flange 15. The recess 16 is preferably radiused to neatly accept the free edge 17 of the downwardly extending lip 18 at the forward or leading end of the hood 11.

The bracket 14 on the side of the recess 16 opposite the flange 15 include a first intermediate planar flange portion 19 and a second trailing planar flange portion 20 angled obtusely to the flange portion 19. The flange portion 20 includes a substantially rectangular longitudinally extending slot 21 which is provided on opposite longitudinal sides with a plurality of teeth 22 of sawtooth configuration.

Figure 5B:
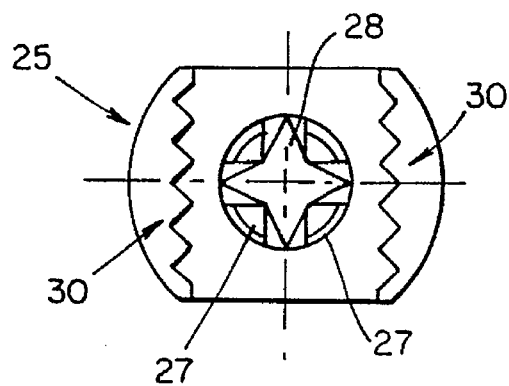
FIGS. 5a, b and c illustrate the expandable plug in isometric, elevation and plan view respectively for use in the fixing assembly.
Figure 5C:
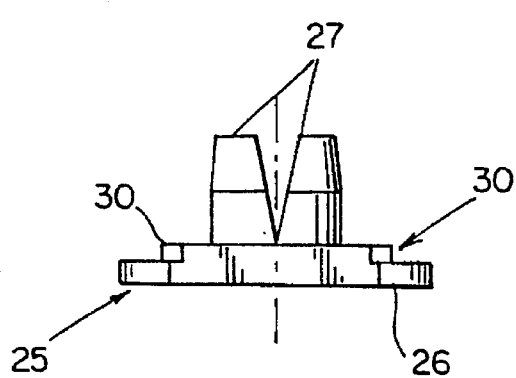
Figure 5A:
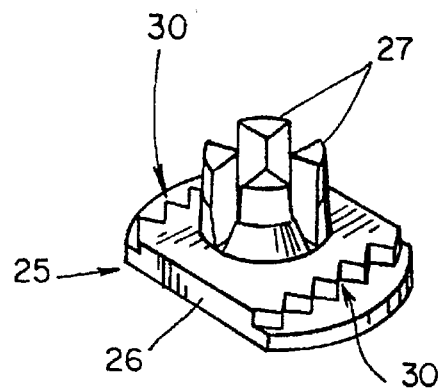

A fastener assembly 23 is adapted to co-operate with the slot 21 and with a preformed hole 24 in the underside of the hood 11 to secure the bracket 14 to the hood 11. The fastener assembly 23 includes an expandable plug 25 which as more clearly shown in FIGS. 5a to c, includes an enlarged head 26 and a plurality of resilient or deformable legs 27 extending from the head 26, the head 26 being provided with a central aperture 28 between the legs 27 for receipt of a self tapping screw 29 which when screwed into the aperture 28 will cause outward expansion or deflection of the legs 27. The underside of the head 26 is provided with a pair of parallel spaced apart rows of teeth 30 on opposite sides of the legs 27 which are in the nature of saw-teeth which are complementary to the teeth 22 on the bracket 14. The rows of teeth 30 are also spaced apart a distance slightly less than the distance between the rows of teeth 22 in the slot 21. This arrangement allows the plug 25 to be located at a series of set positions along the slot 17 through co-operation between the saw-teeth 30 and 22 on the plug 25 and slot 21 respectively.

Figure 6:
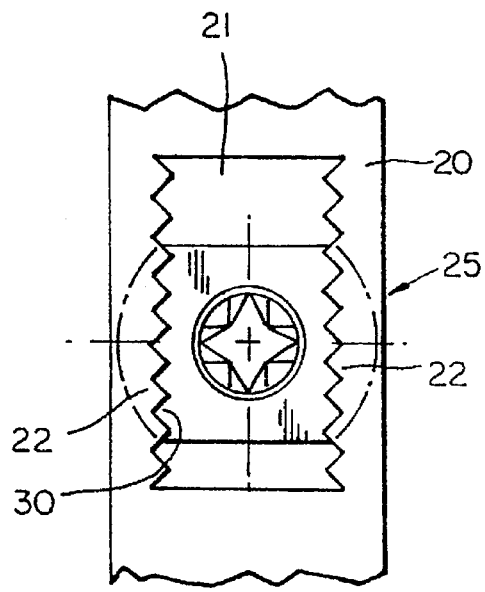
FIG. 6 illustrates from the underside the manner in which the expandable plug is located by the mounting bracket.

For securing the bracket 14 to the hood 11, it is positioned on the underside of the hood 11 such that the recess 16 locates over and receives the edge 17 of the lip 18 as shown in FIG. 3. The bracket 14 is also located adjacent to the preformed hole 24 in the underside of the hood 11 which is aligned with the slot 21. The expandable plug 25 may be positioned so as to be aligned with the hole 24 and thereafter the legs 27 are inserted and pressed into the hole 24 into which they will snap fit. In this position the enlarged head 26 of the plug 25 seats on the outer surface of the flange portion 20 and the respective saw teeth 30 and 22 co-operate to positively position the plug 25 along the slot 21 as shown in FIG. 6. The self tapping screw 29 may then be inserted and screwed into the aperture 28 in the head 26 to cause radial expansion of the legs 27 of the plug 25 to secure the plug 25 within the hole 24 and urge the flange portion 20 against the underside of the hood 11. Securing of the flange portion 20 of the bracket 14 in this fashion firmly locates the recess 16 over the edge 17 of the lip 18 of the hood 11 to thereby provide a substantially rigid mount for the hood protector 12. For this purpose, the obtuse angle between the flange portions 19 and 20 is such that when the flange portion 20 is urged against the underside of the hood 11, a resilient force is applied to the flange portion 19 to urge the recess 16 into engagement with the edge 17 of the hood lip 17.

Figure 7:
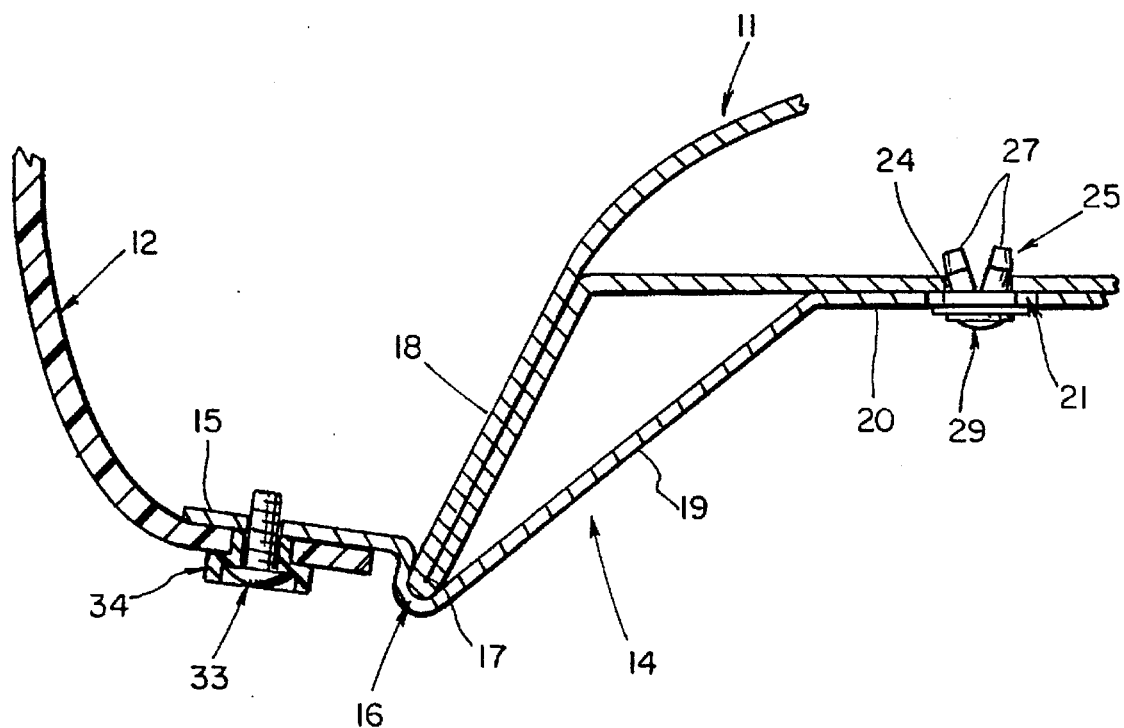
FIG. 7 illustrates in sectional view the assembly of hood, hood protector and fixing assembly of the invention.

For securing the hood protector 12 to the bracket 14, the flange 15 is provided with a threaded aperture or thread formation 31 for accepting a screw. In addition, the hood protector 12 is provided with an elongated mounting aperture 32 (see FIG. 3) which facilitates alignment with the threaded aperture or formation 31. The protector 12 is then located in its desired position relative to the hood 11 such that the elongated aperture 32 is aligned with the threaded aperture or thread formation 31 in the flange 15. The hood protector 12 thereafter may be fixed to the bracket 14 by means of a screw 33 passed through the slot 32 into the threaded aperture 31. A cupped washer 34 may be interposed between the screw 33 and the elongated aperture 32 to prevent damage to the hood protector 12. The assembly of hood 11, hood protector 12 and fixing assembly 12 is shown in FIG. 7.

Using the fixing assembly 13 of the invention allows the hood protector 12 to be mounted to a vehicle 10 without the use of special tools or the necessity for drilling into parts of the hood 11. In addition, as the bracket 14 is engaged over the edge 17 of the hood lip 18 and is positively secured by means of the expandable plug 25, the bracket 14 will provide a firm mount for the hood protector 12 to resist vibrational and other loads. The portions 19 and 20 of the bracket 14 are angled relative to each other such that when the portion 20 is secured in position by the plug 25, the portion 19 is urged downwardly such that the recess 16 firmly engages the edge 18 of the lip 17. This engagement is enhanced by forming the bracket 14 of resilient strip material.

It will be appreciated that other arrangements may be provided for positively positioning the securing plug 25 along the bracket portion 20. For example, the bracket portion 20 may be provided with a plurality of spaced apart holes and the plug 25 may be provided with a pin or pins which, for example may be integrally formed and which are adapted to locate in a selected aperture or apertures to positively locate the plug 25. In other arrangements the bracket 14 may be provided with an upstanding pin or pins adapted to locate within an aperture or apertures on the underside of the head 26 of the plug 25 again to positively position same. Other co-operable positioning arrangements may alternatively be provided for this purpose.

The bracket 14 may be coated with a material to prevent damage to the hood, such material for example comprising a poly-amide coating which preferably covers the flange portion 19, the recess 16 and the flange 15, for example at 35. The expandable plug 25 and washer 34 are preferably formed of a plastics material with the plug 25 suitably being nylon and the washer 34 polyurethane.

Whilst the above has been given by way of illustrative embodiment of the invention, all such modifications and variations thereto as would be apparent to persons skilled in the art are deemed to fall within the broad scope and ambit of the invention as herein defined in the appended claims.

I claim:

1. A fixing assembly for mounting a hood protector to the hood of a vehicle, said hood being of a type which has a downwardly extending leading lip, said fixing assembly including:

a hood protector mounting portion external of the hood in use and spacing the hood protector from the hood;

a locating portion engageable with said lip, and a securing portion adapted to secure to the underside of the hood; whereby securing thereof maintains said locating portion engaged with said lip against vibrational and downward loads.

2. A fixing assembly for mounting a hood protector to the hood of a vehicle, said hood being of a type which has a downwardly extending leading lip, said fixing assembly including:

a hood protector mounting portion external of the hood in use and spacing the hood protector from the hood;

a securing portion adapted to secure to the underside of the hood; and a locating portion interposed between the hood protector mounting portion and the securing portion said locating portion has an elongate groove or recess that partly envelops and engages a section of the lip wherein in use the elongate groove or recess firmly engages the section of the lip when the securing portion is secured to the underside of the hood so that resistance against vibrational and downward loads is provided.

3. A fixing assembly according to claim 1 wherein said securing portion is adapted to receive a fastener assembly for fastening said securing portion to said hood wherein said fastener assembly is adjustable in position along said securing portion including locating means for locating said fastener assembly at one of a plurality of positions along said securing portion.

4. A fixing assembly according to claim 3 wherein said locating means include means on said fastener assembly adapted for alignment with complementary means on said securing portion.

5. A fixing assembly according to claim 4 wherein said locating means are complementary saw-tooth configurations on said fastener assembly and said securing portion.

6. A fixing assembly according to claim 5 wherein said securing portion includes a slot for receiving said fastener assembly, said saw tooth configuration opposing complementary saw-tooth configurations on said fastener assembly.

7. A fixing assembly according to claim 6 wherein said fastener assembly comprises an expandable plug and a plurality of legs depending from said head, said legs being adapted to be received in an aperture in said underside of said hood and receivable by said plug to cause expansion of said legs to receive said expandable plug in said aperture.

8. A fixing assembly according to claim 1 wherein said locating portion comprises an elongated groove or recess adapted to locate over and receive a lower or free edge of said hood lip.

9. A fixing assembly according to claim 8 wherein said mounting portion comprises a flange extending outwardly from said locating portion.

10. A fixing assembly according to claim 9 wherein said mounting flange includes a threaded aperture for receiving an attachment screw for attachment of said hood protector to said flange.

11. A fixing assembly according to claim 1 wherein said fixing assembly comprises a strip-like member, said securing portion and mounting portion being at opposite ends of said member and said locating portion being intermediate said receiving portion and locating portion.

12. A fixing assembly according to claim 2 wherein said securing portion includes first flange extending from said locating portion and a second flange disposed at an obtuse angle to said first flange and adapted to lie substantially co-planar with said underside of said hood.

13. A fixing assembly according to claim 16 and including a fastener assembly for fastening said second flange to said underside of said hood, and locating means for locating said fastener assembly at one of a plurality of positions along said second flange.

14. A fixing assembly according to claim 13 wherein said locating means comprises complementary saw-tooth configurations on said fastener assembly and said second flange.

15. In combination, a hood protector secured to a vehicle hood by means of a fixing assembly as defined in claim 1.

16. A fixing assembly according to claim 12 wherein said fixing assembly includes a fastener assembly for fastening said securing portion to said hood, said fastener assembly being adjustable to any one of a plurality of positions along said securing portion, said fixing assembly also including a locating means for locating said fastener assembly at any one of the plurality of positions along said securing portion.

17. A fixing assembly according to claim 16 wherein said locating means include means on said fastener assembly adapted for alignment with complementary means on said securing portion.

18. A fixing assembly according to claim 13 wherein said locating means are defined by complementary saw-tooth configurations on said fastener assembly and said securing portion.

19. A fixing assembly according to claim 18 wherein said securing portion includes a slot for receiving said fastener assembly, said securing portion having said saw-tooth configuration opposing the complementary saw-tooth configuration on said fastener assembly.

20. A fixing assembly according to claim 19 wherein said fastener assembly includes an expandable plug having an enlarged head and a plurality of legs, said legs being adapted to be received in an aperture in said underside of said hood, said fastener assembly also including an expanding member receivable by said plug to cause expansion of said legs to receive said expandable plug in said aperture.

* * * * *